(12) United States Patent
Naruoka et al.

(10) Patent No.: US 10,012,306 B2
(45) Date of Patent: Jul. 3, 2018

(54) LUBRICATING STRUCTURE FOR POWER TRANSMITTING SYSTEM

(71) Applicant: KAWASAKI JUKOGYO KABUSHIKI KAISHA, Kobe-shi, Hyogo (JP)

(72) Inventors: Shohei Naruoka, Kakogawa (JP); Hisatoyo Arima, Himeji (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 240 days.

(21) Appl. No.: 15/077,128

(22) Filed: Mar. 22, 2016

(65) Prior Publication Data

US 2016/0201792 A1    Jul. 14, 2016

Related U.S. Application Data

(63) Continuation of application No. PCT/JP2013/080515, filed on Nov. 12, 2013.

(51) Int. Cl.
*F16H 57/04* (2010.01)

(52) U.S. Cl.
CPC ......... *F16H 57/0486* (2013.01); *F16H 57/04* (2013.01); *F16H 57/0456* (2013.01)

(58) Field of Classification Search
CPC ... F16H 57/0486; F16H 57/04; F16H 57/0456
See application file for complete search history.

(56) References Cited

U.S. PATENT DOCUMENTS

| | | | | |
|---|---|---|---|---|
| 3,738,452 A | * | 6/1973 | Hausinger | F16H 57/0421 184/6.12 |
| 4,429,587 A | * | 2/1984 | Finn, III | F16H 57/0447 184/6.12 |
| 4,590,820 A | * | 5/1986 | Hambric | F16H 1/22 74/467 |
| 4,687,411 A | * | 8/1987 | Maeda | F16C 35/02 384/538 |

(Continued)

FOREIGN PATENT DOCUMENTS

| | | |
|---|---|---|
| CN | 103477111 | 12/2013 |
| CN | 103883718 | 6/2014 |

(Continued)

OTHER PUBLICATIONS

International Search Report dated Jan. 14, 2014 for PCT/JP2013/080515 (4 pages).

(Continued)

*Primary Examiner* — Michael A Riegelman

(57) ABSTRACT

A power transmission system includes an input shaft, a supercharger rotary shaft disposed coaxially with the input shaft, and a transmission mechanism interposed between the input shaft and the supercharger rotary shaft. A lubricating structure of the power transmission system is provided with an injection passage through which a portion of oil for lubricating bearings for supporting the supercharger rotary shaft is supplied, from a supercharger casing for supporting the bearings, towards the input shaft by means of a jetting spray across an interior space within the transmission mechanism.

14 Claims, 4 Drawing Sheets

(56) References Cited

U.S. PATENT DOCUMENTS

| | | | | |
|---|---|---|---|---|
| 5,522,476 | A * | 6/1996 | Holman | F16H 57/0456 |
| | | | | 184/27.1 |
| 6,516,789 | B1 * | 2/2003 | Jones | F02B 33/40 |
| | | | | 123/559.1 |
| 6,651,633 | B1 * | 11/2003 | Jones | F02B 39/06 |
| | | | | 123/559.1 |
| 7,458,369 | B2 | 12/2008 | Ozawa | |
| 9,068,614 | B2 | 6/2015 | Andersson et al. | |
| 9,127,591 | B2 | 9/2015 | Arima et al. | |
| 9,435,424 | B2 | 9/2016 | Matsuda et al. | |
| 2006/0060170 | A1 * | 3/2006 | Ozawa | F01D 25/20 |
| | | | | 123/559.1 |
| 2006/0243259 | A1 * | 11/2006 | Takahashi | F02C 6/12 |
| | | | | 123/559.1 |
| 2007/0032336 | A1 * | 2/2007 | Eckert | B23Q 1/0036 |
| | | | | 475/331 |
| 2007/0295159 | A1 * | 12/2007 | Nishi | F16H 57/04 |
| | | | | 74/606 R |
| 2012/0186565 | A1 * | 7/2012 | Arima | F02B 33/40 |
| | | | | 123/559.1 |
| 2013/0313053 | A1 * | 11/2013 | Andersson | E02F 9/2083 |
| | | | | 188/71.5 |
| 2014/0174857 | A1 | 6/2014 | Matsuda et al. | |
| 2016/0153545 | A1 * | 6/2016 | Kucukyavuz | F16H 1/28 |
| | | | | 475/159 |
| 2016/0208682 | A1 * | 7/2016 | Naruoka | F02B 33/40 |
| 2016/0208684 | A1 * | 7/2016 | Naruoka | F02B 39/04 |

FOREIGN PATENT DOCUMENTS

| | | |
|---|---|---|
| DE | 3411829 | 10/1984 |
| EP | 0074799 | 3/1983 |
| EP | 0074799 B1 | 3/1983 |
| JP | 60-169462 | 11/1985 |
| JP | 62-184141 | 11/1987 |
| JP | 01-017720 | 5/1989 |
| JP | 02-010298 | 3/1990 |
| JP | 06-058133 | 8/1994 |
| JP | 2006-083713 | 3/2006 |
| WO | WO2011/046096 | 4/2011 |
| WO | WO2012/105874 | 8/2012 |

OTHER PUBLICATIONS

Notification of Reason(s) for Rejection dated Mar. 14, 2016 for Corresponding Japanese Patent Application No. 2015-547297 (5 pages).

English Translation of the International Preliminary Report on Patentability and Written Opinion of the International Searching Authority dated May 26, 2016 for International PCT Patent Application No. PCT/JP2013/080515, filed Nov. 12, 2013 (6 pages).

First Office Action dated Jul. 31, 2017 for Corresponding Chinese Patent Application No. 201380080894.3 with English language translation of the Search Report attached to the Office Action (7 pages).

Extended and Supplementary Search Report dated May 30, 2017 for Corresponding European Patent Application No. 13897655.0 (9 pages).

* cited by examiner

LUBRICATING STRUCTURE FOR POWER TRANSMITTING SYSTEM

CROSS REFERENCE TO THE RELATED APPLICATION

This application is a continuation application, under 35 U.S.C § 111(a) of international application No. PCT/JP2013/080515, filed Nov. 12, 2013.

BACKGROUND OF THE INVENTION

Field of the Invention

The present invention relates to a lubricating structure for a power transmission system that includes an input shaft, an output shaft and a transmission mechanism interposed between the input shaft and the output shaft.

Description of Related Art

In a combustion engine mounted on an automotive vehicle such as, for example, a motorcycle, it is known to use a supercharger for pressurizing and supplying an air to such combustion engine. In this respect, see, for example, the patent document 1 listed below. The supercharger disclosed in this patent document 1 is driven by the power of the combustion engine and makes use of a power transmission system including an input shaft to which the power of the combustion engine is inputted, an output shaft having an impeller of the supercharger provided thereon, and a power transmission mechanism for changing the number of revolutions of the input shaft and then transmitting the power of the engine to the output shaft.

PRIOR ART LITERATURE

Patent Document 1: International Publication WO2011/046096

Although the power transmission system of a kind discussed above requires both of the input shaft and the output shaft being lubricated, the provision of a lubricating passage in both of an input shaft side and an output shaft side is apt to render the structure to be complicated.

SUMMARY OF THE INVENTION

In view of the above, the present invention has been devised to substantially eliminate the above discussed problems and inconveniences and is intended to provide a lubricating structure for a power transmission system that is capable of lubricating both of the input shaft side and the output shaft side with simple structure.

In order to accomplish the foregoing object, the lubricating structure for the power transmission system designed according to the present invention includes an input shaft, an output shaft disposed coaxially with the input shaft, a transmission mechanism connected between the input shaft and the output shaft, and an injection passage for supplying a portion of oil for lubricating one of the input shaft and the output shaft to the other of the input and output shafts by means of a jetting spray that traverses an interior space of the transmission mechanism.

According to the present invention, with the utilization of the oil used to lubricate such one of the input and output shafts, the other of the input and output shafts can be lubricated. Accordingly, there is no need to provide the lubricating structure with a lubricant oil inlet on the other of the shaft sides and, therefore, the lubricating structure can be simplified.

In a preferred embodiment of the present invention, the oil referred to above may be jetted into a hollow of the other of the shafts. Such jetting of the oil allows bearings and others for the other of the shafts to be lubricated with no need to use any extra lubricant passage formed therein. In such case, an inlet for the jetted oil may be formed in an end face of the other of the shafts on a transmission mechanism side, and an annular damming member may then be provided to intercept the flow of the oil, which enters into the hollow, towards the transmission mechanism side. According to this structural feature, since the oil is reserved within the hollow, the lubrication of the other of the shaft sides can be effectively accomplished.

In another preferred embodiment of the present invention, the injection passage may be disposed on a radially outward side of the one of the shafts, and an axis of the injection passage passes on the radially outward side of the one of the shafts. According to this structural feature, the possibility that the oil injected may interfere with the one of the shafts can be avoided. Also, as compared with the provision of the injection passage in an interior space of the one of the shafts then rotating, the oil can be easily jetted towards the other of the shaft sides.

In a further preferred embodiment of the present invention, the transmission mechanism may be in the form of a planetary gear transmission mechanism, in which case the one of the shafts is the output shaft having a sun gear of the planetary gear transmission mechanism, which sun gear is provided on a transmission side axial end portion of the output shaft, and via the injection passage, the oil may be jetted towards the other of the shafts while bypassing the sun gear. In such case, the transmission mechanism may be in the form of a planetary gear transmission mechanism having a non-revolving planetary gear, and via the injection passage, the oil is jetted to the other of the shafts while bypassing the planetary gear. According to this structural feature, with the utilization of the interior space in the planetary gear transmission mechanism, the injection passage can be easily secured.

In a still further preferred embodiment of the present invention, the one of the shafts is a rotary shaft for an impeller of a supercharger, in which case the transmission mechanism may be in the form of a planetary gear transmission mechanism and a supercharger casing, which forms a case of the supercharger, supports the rotary shaft for the impeller through a bearing. In such case, a lubricating oil film may be formed between the supercharger casing and a bearing housing for accommodating the bearing, and a portion of oil forming the lubricating oil film may be supplied to the injection passage. According to this structural feature, with the utilization of the lubricant oil in the lubricant oil film, the bearings and the other of the shaft sides can be lubricated. Accordingly, the lubricating structure can be further simplified.

Where the power transmission system is for use in the supercharger, the supercharger may be driven by the power of an engine, in which case a power transmitting member to transmit the power of the engine to the other of the shafts is fitted to the other of the shafts, and a portion of the oil supplied to the other of the shafts is supplied to the power transmitting member. The power transmitting member is in the form of, for example, a damping member, a sprocket, a gear, one-way clutch, a chain and so on. According to this structural feature, the lubricant oil can also be supplied to the power transmitting member.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with particular reference to the accompanying drawings. In describing the present invention, however, the terms "left side" and "right side", or similar notations, that are used hereinabove and hereinafter are to be understood as relative terms descriptive of positions and/or directions as viewed from a vehicle rider occupying the seat during the forward travel of the vehicle.

Figure 1:
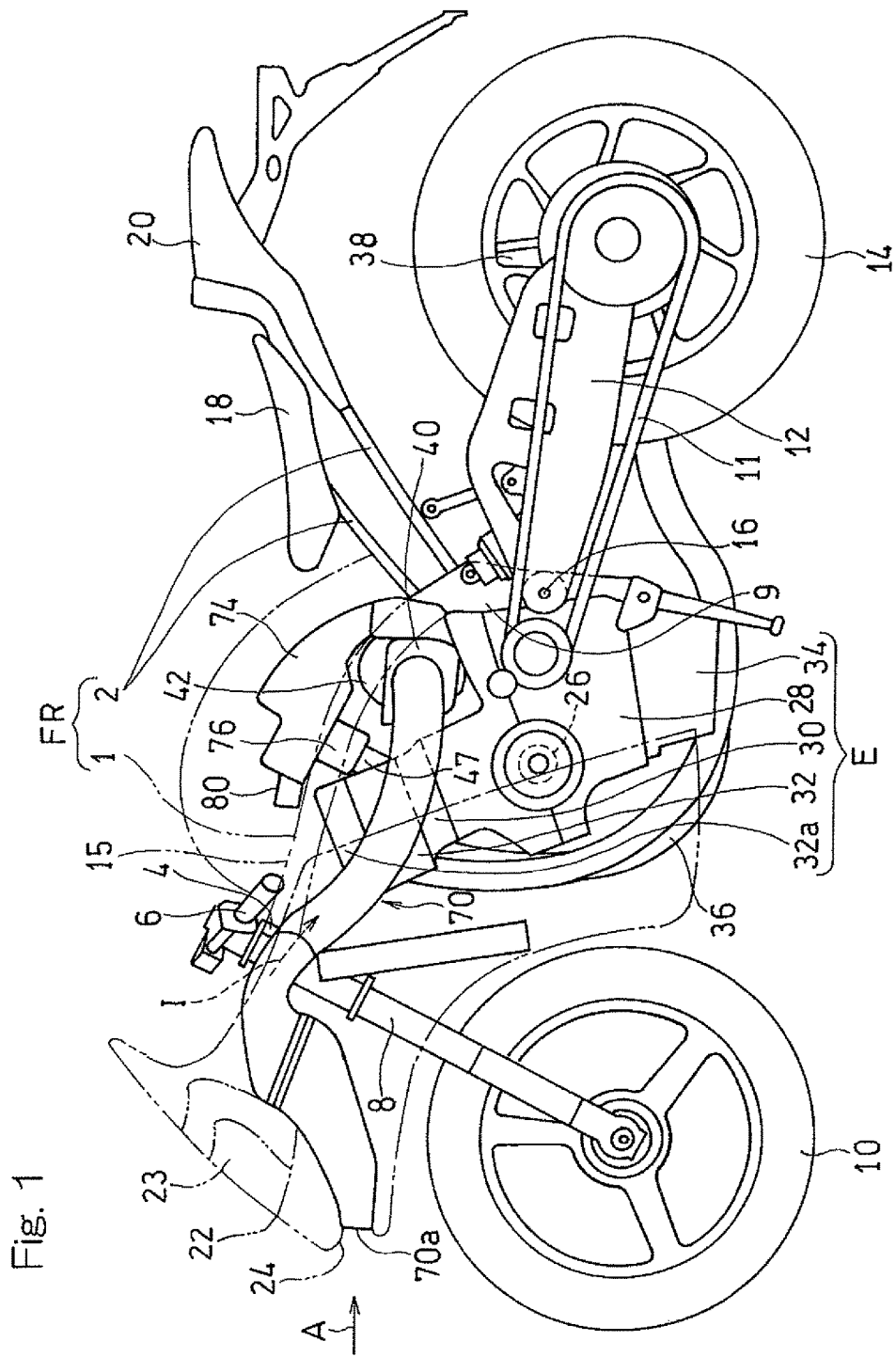
FIG. 1 is a schematic side view showing a motorcycle equipped with a lubricating structure designed in accordance with a preferred embodiment of the present invention.

FIG. 1 is a left side view of a vehicle such as, a motorcycle, equipped with a lubricating structure designed in accordance with a preferred embodiment of the present invention. A motorcycle frame structure FR of the illustrated motorcycle includes a main frame 1, forming a front half thereof, and a seat rail 2 forming a rear half thereof. The seat rail 2 is rigidly secured to a rear portion of the main frame 1. A head pipe 4 is integrally formed with a front end of the main frame 1, and a front fork 8 is rotatably supported by this head pipe 4 through a steering shaft (not shown) for rotation about a longitudinal axis of the steering shaft. A front wheel 10 is fitted to a lower end portion of the front fork 8, and a handlebar 6 for steering purpose is fixed to an upper end portion of the front fork 8 for rotation together with the latter.

On the other hand, a swingarm bracket 9 is provided in a rear end portion of the main frame 1, which is a lower intermediate portion of the motorcycle frame structure FR. Around a pivot pin 16 which is provided at the swingarm bracket 9, a swingarm 12 is supported for rocking movement up and down. A rear wheel 14 is rotatably supported by a rear end portion of the swingarm 12. A combustion engine E, which is a drive source of the motorcycle, is fitted to a front side of the swingarm bracket 9 at a lower intermediate portion of the motorcycle frame structure FR. This combustion engine E drives the rear wheel 14 through a power transmission mechanism 11 such as, for example, a substantially endless belt. The combustion engine E referred to above is in the form of, for example, a water-cooled, four cylinder four cycle parallel multi-cylinder engine, but the type of engine that can be employed in the practice of the present invention is not necessarily limited thereto.

A fuel tank 15 is disposed on an upper portion of the main frame 1, and a driver's seat 18 and a fellow passenger's seat 20 are supported on the seat rail 2. Also, a cowl or fairing, made of a resinous material, is mounted on a front portion of a vehicle body, such as a motorcycle body. This fairing 22 covers a region ranging from an area forwardly of the head pipe 4 to opposite side areas laterally of the front portion of the motorcycle body. The fairing 22 has a headlamp unit 23 mounted thereon. The fairing 22 also has an air intake opening 24 defined therein. This air intake opening 24 is positioned below the headlamp unit 23 and introduces therethrough an air to be supplied towards the combustion engine E.

An air intake duct 70 is disposed on a left side of the motorcycle frame structure FR. The air intake duct 70 is supported by the head pipe 4 with a front end opening 70a thereof aligned with the air intake opening 24 in the fairing 22. An air introduced inwardly from the front end opening 70a of the air intake duct 70 has its pressure boosted by the known ram effect.

The combustion engine E includes a crankshaft 26 extending in a leftward and rightward direction (motorcycle widthwise direction), a crankcase 28 for supporting the crankshaft 26, a cylinder block 30 protruding upwardly from a front upper surface of the crankcase 28, a cylinder head 32 above the cylinder block 30, a cylinder head covering 32a for covering an upper portion of the cylinder head 32, and an oil pan 34 provided below the crankcase 28. The cylinder block 30 and the cylinder head 32 are somewhat tilted forwards. Four exhaust pipes 36 are connected with exhaust ports at a front surface of the cylinder head 32. Those four exhaust pipes 36 are merged at a site below the combustion engine E and are then fluid connected with an exhaust muffler 38 disposed on a right side of the rear wheel 14.

An air cleaner 40 for substantially purifying an air and a supercharger 42 are disposed on an upper surface of the crankcase 28 at a location rearwardly of the cylinder block 30 and are juxtaposed relative to each other in the motorcycle widthwise direction. The air intake duct 70 referred to previously extends from a location forwardly of the combustion engine E and passing laterally outwardly of the cylinder head 32 and serves to introduce, as an intake air I, an incoming wind A towards the air cleaner 40. The supercharger 42 is operable to pressurize the substantially cleaned air from the air cleaner 40 and then supply it to the combustion engine E.

Figure 2:
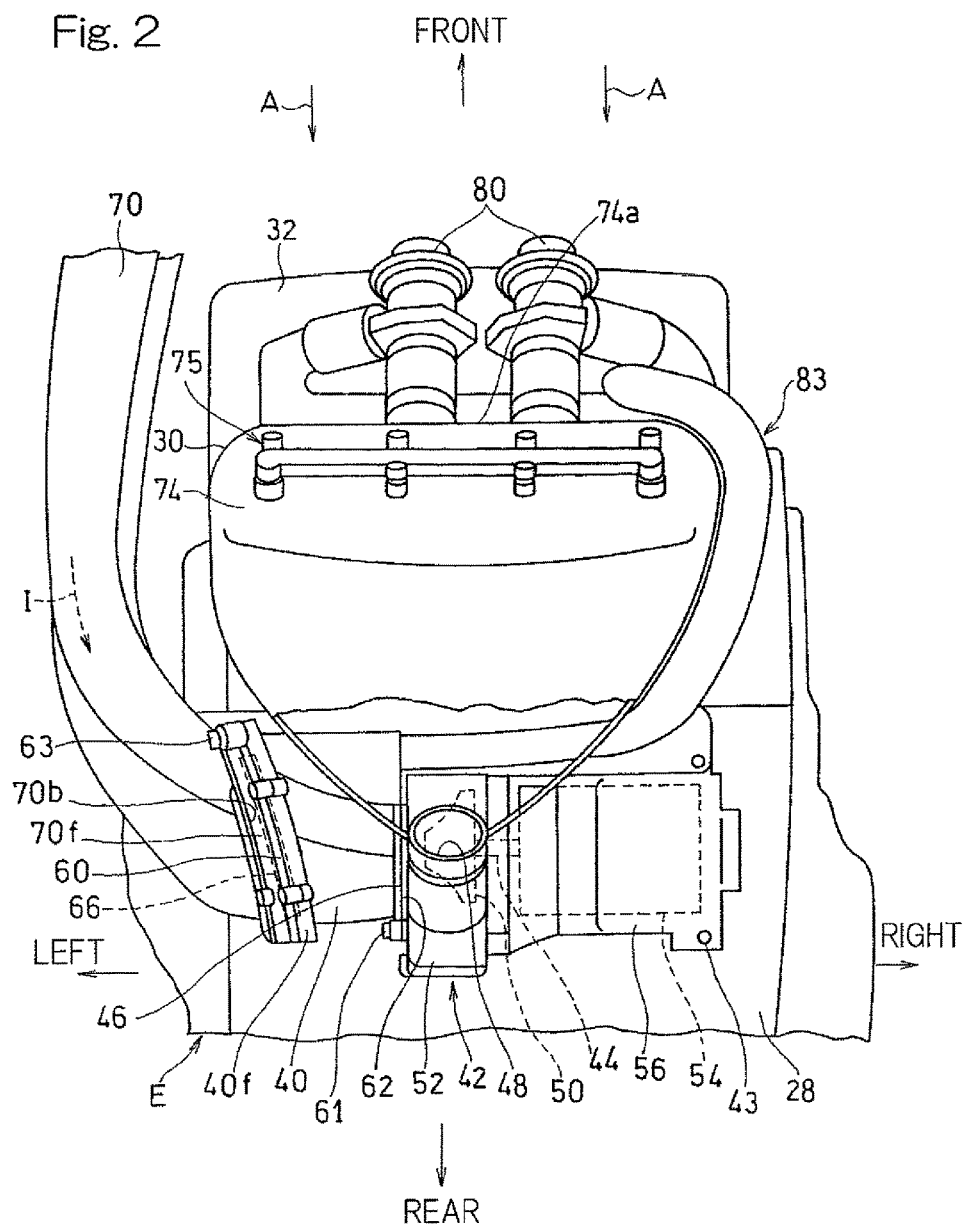
FIG. 2 is a perspective view showing a combustion engine of the motorcycle as viewed diagonally downwardly from above.

As shown in FIG. 2, the supercharger 42 is disposed on a right side of and next to the air cleaner 40, and includes a supercharger rotary shaft 44 that extends in the motorcycle widthwise direction. This supercharger 42 is fixed to the upper surface of the crankcase 28 by means of bolts 43. An intake port 46 of the supercharger 42 is positioned above the crankcase 28 and somewhat leftwardly of an intermediate portion of the combustion engine E in the motorcycle widthwise direction. A discharge port 48 of the supercharger 42 is positioned at an intermediate portion of the combustion engine E with respect to the motorcycle widthwise direction. The intake port 46 opens towards the left side, whereas the discharge port 48 opens upwardly.

The supercharger 42 includes a centrifugal impeller 50 for pressurizing the intake air, an impeller casing 52 for covering the impeller 50, a transmission mechanism 54 for transmitting the power of the combustion engine E to the impeller 50, and a supercharger casing 56 for rotatably supporting the supercharger rotary shaft 44. The supercharger casing 56 covers the transmission mechanism 54. The supercharger casing 56 and the air cleaner 40 are disposed in the motorcycle widthwise direction with the impeller casing 52 sandwiched therebetween. In the practice of the embodiment now under discussion, the transmission mechanism 54 is employed in the form of a planetary gear transmission mechanism. It is, however, to be noted that the present invention is not necessary limited to the use of a planetary type speed reducer and any other transmission mechanism such as, for example, a Harmonic Drive (a registered trademark), which is a wave gear device, may be used.

The air cleaner 40 has a cleaner outlet 62 connected with the intake port 46 of the supercharger 42 by means of bolts 61. The air intake duct 70 has a rear end portion 70b connected with an cleaner inlet 60 of the air cleaner 40 by means of bolts 63. Between a flange portion 70f of the air intake duct 70 and a flange portion 40f of the air cleaner 40, an element 66 for substantially purifying the air (intake air) I is disposed.

As shown in FIG. 1, an intake air chamber 74 is disposed between the discharge port 48 of the supercharger 42 and an air intake port 47 of the combustion engine E. The discharge port 48 of the supercharger 42 and the intake air chamber 74 are directly connected with each other. The intake air chamber 74 serves to reserve a high pressure intake air supplied from the discharge port 48 of the supercharger 42. It is, however, to be noted that instead of the direct connection between the discharge port 48 and the intake air chamber 74 as described above, the both may be connected with each other through a pipe.

A throttle body 76 is disposed between the intake air chamber 74 and the cylinder head 32. In this throttle body 76, a fuel is injected from a fuel injector 75 (best shown in FIG. 2) into the intake air to thereby form an air-fuel mixture, which is in turn supplied into a combustion chamber (not shown) within a cylinder bore defined in the combustion engine E.

The intake air chamber 74 referred to above is disposed above the supercharger 42 and the throttle body 76 and rearwardly of the cylinder head 32. The air cleaner 40 is disposed below the throttle body 76 and, when viewed from side, between the crankcase 28 and the intake air chamber 74. The fuel tank 15 referred to previously is disposed above the intake air chamber 74 and the throttle body 76.

As shown in FIG. 2, the intake air chamber 74 has a front surface 74a provided with relief valves 80 each operable to suppress an increase of the internal pressure of the intake air chamber 74. This relief valve 80 is connected with a relief pipe 83. The relief pipe 83 is, after having extended on a right side of the intake air chamber 74 in a direction diagonally rearwardly and downwardly and then extended in a leftward direction between both of the cylinder block 30 and the cylinder head 32 and the supercharger 42 at a location below the intake air chamber 74 and the throttle body 76, connected with the air cleaner 40.

Figure 3:
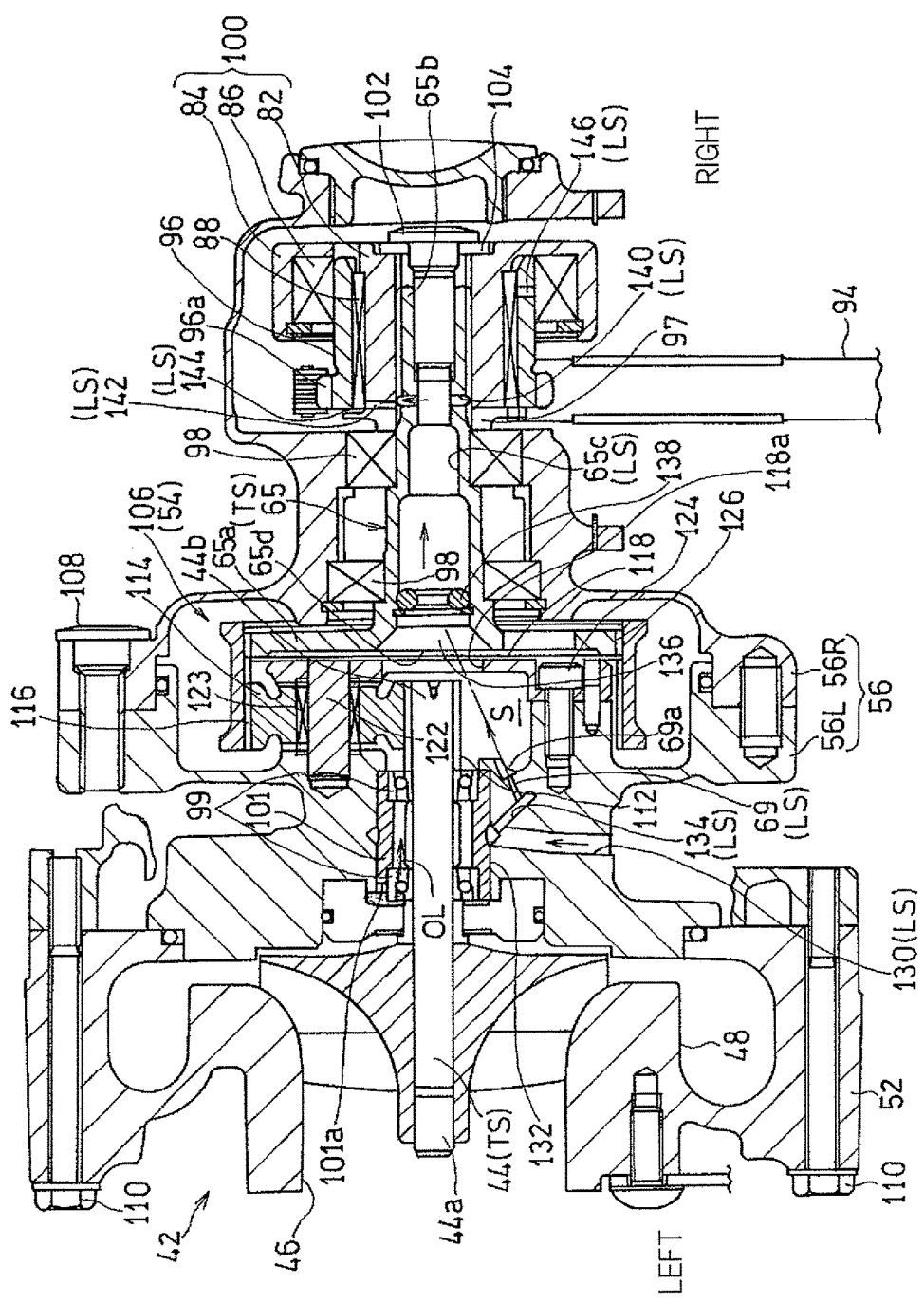
FIG. 3 is a schematic longitudinal sectional view showing a supercharger mounted on the combustion engine.

The supercharger 42 is driven by the power of the combustion engine E. Specifically, a rotational force of the crankshaft 26 (best shown in FIG. 1) is transmitted to an input shaft 65, which is drivingly connected with the supercharger rotary shaft 44, through a chain 94 best shown in FIG. 3. More specifically, the input shaft 65 has a right side end portion provided with a sprocket 96, and the chain 94 referred to above is trained around teeth 96a of the sprocket 96. The input shaft 65 forms a rotary shaft of the transmission mechanism 54.

The input shaft 65 is in the form of a hollow shaft and is rotatably supported by the supercharger casing 56 through bearings 98. This input shaft 65 has a right side end portion 65b having its outer peripheral surface formed with splined teeth, and the sprocket 96 is drivingly connected with the input shaft 65 through a one-way clutch 100 that is splined to the outer peripheral surface of the input shaft 65. Specifically, the one-way clutch 100 includes a clutch inner ring 82 splined to the input shaft 65, a clutch outer ring 84, and a clutch element 86 interposed between the clutch inner ring 82 and the clutch outer ring 84. The sprocket 96 is connected with the clutch outer ring 84 through the clutch element 86 and is also rotatably supported by the clutch inner ring 82 through a bearing 88.

A spacer 97 is interposed between the bearing 98 and the clutch inner ring 82 of the one-way clutch 100. The chain 94, the sprocket 96 and the one-way clutch 100 cooperate with each other to define a power transmitting member for transmitting the power of the combustion engine E to the input shaft 65. The right side end portion 65b of the input shaft 65 has its inner peripheral surface formed with a male threaded portion. The one-way clutch 100 is mounted on the right side end portion 65b of the input shaft 65 by means of a head of a bolt 102, which is engaged with the male threaded portion, through a washer 104.

The supercharger rotary shaft 44 of the supercharger 42 has a left side end portion 44a to which the impeller 50 is fixed, and also has a left side portion 44b connected with the left side end portion 65a of the input shaft 65 through a planetary gear device 106 which forms the transmission mechanism 54. The left side end portion 65a of the input shaft 65 is in the form of a collar shaped flange portion 65a.

The supercharger rotary shaft 44 is rotatably supported by the supercharger casing 56 through bearings 99. Each of those bearings 99 is accommodated within a bearing housing 101. The supercharger casing 56 includes an input shaft casing portion 56R for supporting the input shaft 65 and an output shaft casing portion 56L for supporting the supercharger rotary shaft 44. The input shaft casing portion 56R and the output shaft casing portion 56L are connected with each other with the use of bolts 108. Also, an impeller housing 52 is connected with the output shaft casing portion 56L of the casing 56 with the use of bolts 110. The impeller housing 52 is formed with the intake port 46, which is opened towards the left side, and the discharge port 48, which is opened upwardly.

The planetary gear device 106 is disposed between the input shaft 65 and the supercharger rotary shaft 44, and is supported by the supercharger casing 56. In other words, the input shaft 65, to which the power of the combustion engine E is inputted, and the output shaft (supercharger rotary shaft) 44 disposed coaxially with the input shaft 65 cooperate with each other to define a power transmission system TS, and the planetary gear device 106 (transmission mechanism 54) is operable to change (increase, in the instance now under discussion) the number of revolutions of the power, which has been inputted to the input shaft 65, and then to transmit it to the output shaft (supercharger rotary shaft) 44. So to speak, of the two shafts 44 and 65, the output shaft (supercharger rotary shaft) 44 rotates at a higher speed.

The supercharger rotary shaft 44 has a right side end portion (transmission side end portion) 44b formed with an circumferentially threaded portion 112, and a plurality of planetary gears 114 disposed externally around this right side end portion 44b are geared with the externally threaded portion 112. In other words, the externally threaded portion 112 of the supercharger rotary shaft 44 functions as a sun gear of the planetary gear device 106. Also, the planetary gears 114 are meshed with a large diameter internal gear (ring gear) 116 at a location radially outwardly thereof. Those planetary gears 114 are rotatably supported by a carrier shaft 122 through bearings 123 mounted on the supercharger casing 56.

The carrier shaft 122 is fixed to a fixture member 118, and the fixture member 118 is in turn fixed to the supercharger casing 56 by means of a bolt 124. In other words, the carrier shaft 122 is fixed. The input shaft 65 and the supercharger rotary shaft 44 (output shaft) are disposed having spaced a distance from each other in an axial direction and the fixture member 118 is formed with a throughhole 118a that is coaxial with the input and output shafts 65 and 44.

The internal gear 116 is meshed with an input gear 126 that is provided on the left side end portion of the input shaft 65. Accordingly, the internal gear 116 is meshed with the input shaft 65 so as to rotate in the same direction of rotation as that of the input shaft 65 and, with the carrier shaft 122 fixed, the planetary gears 114 rotate in the same direction as the direction of rotation of the internal gear 116. The sun gear (external gear 112) is formed in the supercharger rotary shaft 44, which serves as the output shaft, and rotates in a direction counter to the direction of rotation of the planetary gears 114. In other words, the planetary gear device 106 is in the form of a planetary gear transmission mechanism of a kind having non-revolving planetary gears 114, and is operable to increase the number of rotations of the input shaft 65 and then to transmit it to the supercharger rotary shaft 44 so as to rotate the latter in a direction counter to the direction of rotation of the input shaft 65.

The output shaft casing portion 56L of the supercharger casing 56 is formed with a first lubricant oil passage 130 communicated with a supercharger lubricating passage (not shown), which is provided outside of the supercharger casing 56, and is operable to conduct a lubricant oil to the bearing housing 101. Specifically, a lubricant oil film 132 is formed between the output shaft casing portion 56L and the bearing housing 101, and the first lubricant oil passage 130 referred to above is fluid connected with this lubricant oil film 132. The lubricant oil film 132 has a function of relieving a rocking motion of the supercharger rotary shaft 44. It is, however, to be noted that the lubricant oil film 132 is not necessarily employed.

Figure 4:
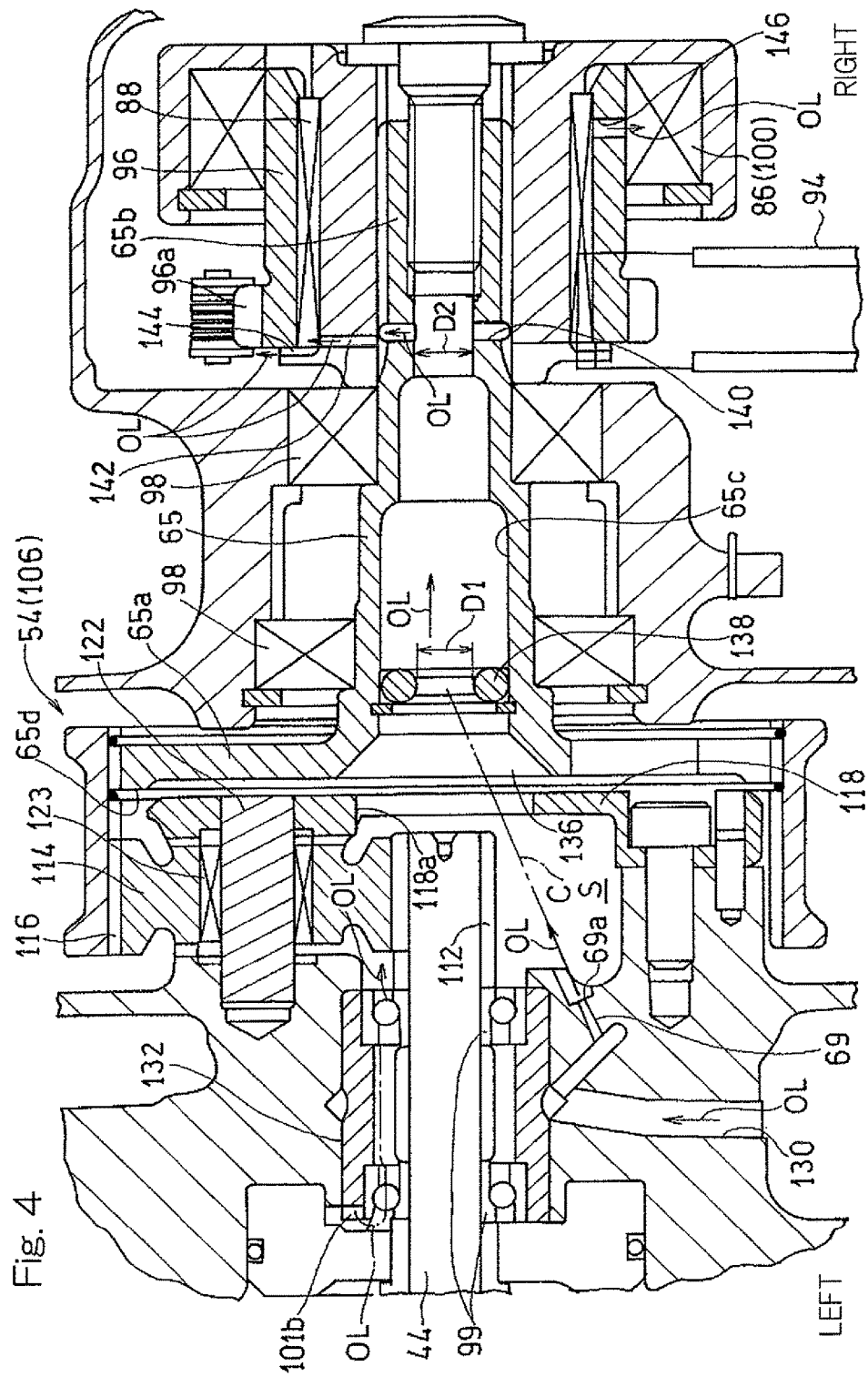
FIG. 4 is a fragmentary longitudinal sectional view showing a portion of FIG. 3 on an enlarged scale.

As clearly shown in FIG. 4, the bearing housing 101 has an axially end face (left side end face) 101a that is formed with a radially extending groove-like notch 101b. Oil OL supplied to the lubricant oil film 132 is, after having passed through this notch 101b, supplied to the bearings 99 to lubricate the latter.

The output shaft casing portion 56L is formed with an injection passage 69 branched off from the first lubricant oil passage 130. This injection passage 69 serves to supply a portion of the oil OL, then flowing through the first lubricant oil passage 130, to the input shaft 65 by means of a jetting spray traversing an interior space S of the transmission mechanism 54 from the output shaft casing portion 56L. In other words, the injection passage 69 serves to supply a portion of the oil OL, which lubricates the bearings 99 that support the supercharger rotary shaft 44, to the input shaft 65 by means of the jetting spray traversing the interior space S from the output shaft casing portion 56L.

The injection passage 69, after having branched off from the first lubricant oil passage 130, extends radially inwardly and sidlingly towards a transmission mechanism 54 side (right side). This injection passage 69 has a downstream end provided with an injection opening 69a that is oriented towards the input shaft 65. The injection passage 69 is disposed radially outwardly of the supercharger rotary shaft 44 with its axis C extending radially outwardly of the supercharger rotary shaft 44. The injection opening 69a referred to above is disposed at a location closer to the transmission mechanism 54 than to the bearings 99. Accordingly, the injecting position approaches the input shaft 65 and, therefore, the supply of the oil OL to the input shaft 65 is facilitated. Also, since the fixture member 118 has the throughhole 118a defined therein in coaxial relation with the input and output shafts 65 and 44, the oil OL can be conducted towards an input shaft 65 side without being intercepted by the supercharger rotary shaft 44 (output shaft) and the fixture member 118.

The oil OL jetted from the injection opening 69a is, while bypassing or dodging the external gear (sun gear) 112 and the planetary gears 114, injected onto the input shaft 65. In the practice of the embodiment now under discussion, the oil OL is injected from a supercharger rotary shaft 44 side that is connected with the external gear (sun gear) 112 and, therefore, the oil OL can be easily injected in between the external gear (sun gear) 112 and the internal gear (ring gear) 116. The interior space S referred to previously may be formed at a predetermined fixed position regardless of rotation of the input shaft 65 and the output shaft 44, but may be so formed as to rotate about an axis accompanying the rotation of the input shaft 65 and the output shaft 44.

The injection passage 69 referred to above has a space of a diameter smaller than that at an upstream side thereof, which space is formed in the vicinity of the injection opening 69a. Accordingly, the oil OL can be linearly injected while suppressing a dispersion of the injected oil OL. In view of this, the oil OL can be efficiently conducted towards the input shaft 65 while the amount of the oil OL departing from the input shaft 65 is minimized. Also, by spraying the oil OL in an atomized fashion, an atmosphere of the lubricant oil is created within the interior space S, and the eternal gear (sun gear) 112, the planetary gears 114 and others can thus be lubricated with oil. With the injection pressure and the injecting angle of the oil OL properly set, the oil OL can be effectively supplied to the input shaft 65. By way of example, even when the injection pressure of the oil OL is low, the oil OL can be effectively supplied to the input shaft 65 if the oil OL is injected from a position spaced a distance radially outwardly to render the injection locus of the oil OL to represent a parabolic pattern.

The oil OL jetted from the injection opening 69a is supplied into a hollow portion 65c of the input shaft 65. The hollow portion 65c is a space extending in a direction axially of the input shaft 65 and open towards an output shaft side. The hollow portion 65c is a cylindrical space coaxial with the input shaft 65 and, in the practice of the embodiment now under discussion, the hollow portion 65c is so formed as to represent a stepped shape in which the diameter thereof increases towards the supercharger rotary shaft 44 (output shaft). The hollow portion 65c has a left side end portion so formed as to represent a truncated cone shape in which the diameter thereof increases towards the supercharger rotary shaft 44. By so designing the hollow portion 65c as to have the increased diameter on the supercharger rotary shaft 44 side, the oil OL jetted can be easily introduced into the hollow portion 65c. It is, however, to be noted that the hollow portion 65c may be so designed as to have a diameter gradually increasing towards the supercharger rotary shaft 44.

An inlet opening 136 for the oil OL so injected is formed in an end face 65d of the input shaft 65 on the transmission mechanism 54 side (left side). In the vicinity of the inlet opening 136 in the hollow portion 65c, an annular damming member 138 is provided. The damming member 138 serves to inhibit the oil OL, once entering the hollow portion 65c, from being drained towards the transmission 54 side.

The damming member 138 is the annular member coaxial with the input shaft 65. In the practice of the embodiment now under discussion, the damming member 138 has an inter diameter D1 that is smaller than the diameter D2 of the smallest diameter portion of the hollow portion 65c, that is, D1<D2. The oil OL introduced into the hollow portion 65c is affected by a force acting in a radially outer direction by the effect of a centrifugal force brought about by the rotation of the input shaft 65. Accordingly, the oil OL within the hollow portion 65c flows towards the right side counter to the supercharger rotary shaft 44 before overflowing the damming member 138.

On a right side of the input shaft 65, a second lubricant passage 140 is formed so as to extend from the hollow portion 65c towards a radially outer side. The second lubricant passage 140 is disposed in the leftward neighborhood of the splined teeth on the right side end portion 65b of the input shaft 65. A radially extending first groove shaped passage 142 is formed on a left side end face of the inner ring 82 of the one-way clutch 100.

Between the spacer 97 and a left side end face of the sprocket 96, a radially extending second groove shaped passage 144 is formed. The second lubricant passage 140 and the first and second groove shaped passages 142, 144 are all formed at the substantially same axial position. Also, a third lubricant passage 146, which extends in a radial direction across the sprocket 96, is formed on a right side end portion of the sprocket 96. This third lubricant passage 146 serves to communicate the space, in which the bearing 88 is disposed, and the space, in which the clutch element 86 is disposed, with each other.

The first lubricant oil passage 130, the notch 101b, the injection passage 69, the hollow portion 65c of the input shaft 65, the second and third lubricant passages 140, 146 and the first and second groove shaped passages 142, 144 cooperate with each other to form a lubricating structure LS for the power transmission system TS.

In the preferred embodiment described above, when the motorcycle is driven forwards, the power of the combustion engine E shown in FIG. 1 is transmitted to the supercharger rotary shaft 44 through the endless chain 94, whereby the supercharger 42 is driven. When the combustion engine E (shown in FIG. 1) and the supercharger 42 are so driven, the oil OL from the combustion engine E is supplied to the first lubricant oil passage 130.

As shown in FIG. 4, the oil OL introduced into the first lubricant oil passage 130 forms the lubricant oil film 132. A portion of the oil L of the lubricant oil film 132 flows towards the axially right side, after having flown radially inwardly past the notch 101b, to thereby lubricate the bearings 99 and the external gear (sun gear) 112.

A portion of the oil OL introduced into the first lubricant oil passage 130 is supplied to the injection passage 69 and is subsequently supplied into the hollow portion 65c of the input shaft 65 by means of the jetting spray from the injection opening 69a. The oil OL jetted from the injection opening 69a flows through the interior space S of the transmission mechanism (planetary gear transmission mechanism) 54. Specifically, the oil OL so jetted is injected towards the input shaft 65 after having flown through gaps delimited between the external gear (sun gear) 112 and the planetary gears 114.

The oil OL introduced into the hollow portion 65c of the input shaft 65 flows through the hollow portion 65c towards the axially right side thereof and, by the effect of the centrifugal force, through the second lubricant passage 140 and then towards the radially outer side. The oil OL having flown through the second lubricant passage 140 lubricates the splined teeth on the right side end portion 65b of the input shaft 65.

Also, a portion of the oil OL having flown through the second lubricant passage 140 flows towards a radially outer side through the first groove shaped passage 142 to lubricate the bearing 88. The oil having lubricated the bearing 88 flows towards the radially outer side through the third lubricant passage 146 to lubricate the clutch element 86 of the one-way clutch 100.

A portion of the oil OL having flown through the first groove shaped passage 142 flows in a radially outer side through the second groove shaped passage 144 to lubricate the teeth 96a of the sprocket 96 and the endless chain 94.

In the construction described hereinabove, the input shaft 65 side is lubricated with the use of the oil OL for lubricating the output shaft (supercharger rotary shaft) 44 side. Moreover, when the oil OL for lubricating the output shaft 44 is supplied towards the input shaft 65 side, the oil OL is jetted towards the hollow portion 65c of the input shaft 65. Accordingly, there is no need to use any lubricant oil inlet on the input shaft 65 side and, therefore, the lubricating structure can be simplified.

Also, on the left side end face 65d (end face of the transmission mechanism side) of the input shaft 65, the inlet opening 136 for the injected oil OL is formed and further, the annular damming member 138 is provided for inhibiting the oil OL, which has entered the hollow portion 65c, from being drained towards the transmission mechanism side (left side). Accordingly, since the oil OL is reserved within the hollow portion 65c, lubrication on the input shaft 65 side can be carried out effectively.

The injection passage 69 is disposed radially outwardly of the supercharger rotary shaft 44 and has its axis C passing radially outwardly of the supercharger rotary shaft 44. Accordingly, an undesirable interference of the injected oil OL with the supercharger rotary shaft 44 can be avoided. In addition, as compared with the provision of the injection passage within the interior space of the supercharger rotary shaft 44, the oil can be easily injected into the input shaft 65 side.

Via the injection passage 69, the oil OL is, while dodging the sun gear (external gear) 112 and the non-revolving planetary gears 114, injected onto the input shaft 65. Accordingly, by utilizing the interior space S of the planetary gear device 106, the injection passage 69 can be easily secured.

Furthermore, a portion of the oil OL forming the lubricant oil film 132 is supplied into the injection passage 69. Accordingly, by utilizing the oil OL in the lubricant oil film 132, the bearings 99 and the input shaft 65 side can be lubricated. As a result, the lubricating structure can be further simplified.

Moreover, with the use of the oil OL jetted from the injection passage 69, the teeth 96a of the sprocket 96, the one-way clutch 100, the endless chain 94 and others are lubricated. Thus, using the oil OL for lubricating the output shaft (supercharger rotary shaft) 44 side, not only can the bearing 98 for the input shaft 65 be lubricated, but the power transmitting member can also be lubricated.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing embodiment of the present invention, the oil OL has been described as jetted from the output shaft (supercharger rotary shaft) 44 side of the power transmission system TS towards the input shaft 65, the oil may be alternatively injected from the input shaft side towards the output shaft. It is, however, to be noted that the oil OL is preferably supplied towards the output shaft (supercharger rotary shaft) 44 which rotates at a high speed, with a portion of such oil OL being jetted towards the input shaft 65 as is the case with the foregoing embodiment shown and described.

Also, although in describing the foregoing embodiment of the present invention, the hollow portion 65 of the input shaft 65 has been shown and described as having its diameter increasing towards the supercharger rotary shaft 44, the diameter may be increased in a direction away from the supercharger rotary shaft 44. In such case, the oil OL can be easily migrated towards the side opposite to the supercharger rotary shaft 44.

Also, although in describing the foregoing embodiment of the present invention, that portion of the oil OL used to lubricate the bearings 99 of the supercharger rotary shaft 44 (output shaft) has been shown and described as used in the lubrication on the input shaft 65 side, a portion of the oil OL for the purpose other than the lubrication of the bearings 99 may be employed.

Moreover, the lubricating structure designed in accordance with the present invention can be equally applied to any other transmission mechanism of a type equipped with input and output shafts that are disposed coaxially with each other. Besides the planetary gear transmission mechanism, the transmission mechanism may be in the form of a wave gear device or in the form of a transmission mechanism that is used in any other device than the supercharger. Also, the transmission mechanism may be in the form of a planetary gear transmission mechanism equipped with revolving planetary gears, which may be either a speed increaser or a speed reducer.

Furthermore, although in describing the foregoing embodiment of the present invention, reference has been made to the supercharger that is driven by the power of the combustion engine for the motorcycle, the lubricating structure of the present invention can be equally applied to any other vehicle engines than the motorcycle engine. Also, the lubricating structure of the present invention can be equally applied to any other power transmitting system in general, provided that it is equipped with a transmission mechanism of a type utilizing an input shaft and an output shaft. Further, the present invention can be applied to the supercharger which is not driven by the power of the engine, and can also be applied to the power transmitting system for any other device than the supercharger.

Accordingly, such changes and modifications discussed hereinabove are, unless they depart from the scope of the present invention as delivered from the claims annexed hereto, to be construed as included therein.

REFERENCE NUMERALS

42 . . . Supercharger
44 . . . Supercharger rotary shaft (Output shaft, Output shaft of the sun gear)
54 . . . Transmission mechanism (Planetary gear transmission mechanism)
65 . . . Input shaft
69 . . . Injection passage
E . . . Engine
OL . . . Oil

What is claimed is:

1. A lubricating structure for a power transmission system comprising:
    an input shaft;
    an output shaft disposed coaxially with the input shaft;
    a transmission mechanism connected between the input shaft and the output shaft, the transmission mechanism being in the form of a plantetary gear transmission mechanism; and
    an injection passage to supply a portion of oil for lubricating one of the input shaft and the output shaft, to the other of the input shaft and the output shaft by means of a jetting spray that traverses an interior space of the transmission mechanism, wherein
    the one of the shafts is the output shaft having a sun gear of the planetary gear transmission mechanism, which sun gear is provided on a transmission side axial end portion of the output shaft; and
    via the injection passage, the oil is jetted towards the other of the shafts in between the sun gear and a ring gear of the planetary gear transmission mechanism.

2. The lubricating structure for the power transmission system as claimed in claim 1, wherein the oil is jetted into a hollow of the other of the shafts.

3. The lubricating structure for the power transmission system as claimed in claim 2, wherein the hollow has a bore diameter increasing towards the one of the shafts.

4. The lubricating structure for the power transmission system as claimed in claim 2, wherein an inlet for the jetted oil is formed in an end face of the other of the shafts on a transmission mechanism side, and
    an annular damming member is provided to intercept the flow of the oil, which enters into the hollow, towards the transmission mechanism side.

5. The lubricating structure for the power transmission system as claimed in claim 4, wherein the annular damming member has a bore diameter smaller than the bore diameter of the hollow.

6. The lubricating structure for the power transmission system as claimed in claim 1, wherein the injection passage is disposed on a radially outward side of the one of the shafts, and
    an axis of the injection passage passes on the radially outward side of the one of the shafts.

7. The lubricating structure for the power transmission system as claimed in claim 6, wherein:
    the injection passage is formed at a casing configure to support the one of the shafts; and
    the injection passage is branched off from a lubricant oil passage configure to supply the oil into the one of the shafts.

8. The lubricating structure for the power transmission system as claimed in claim 1, wherein the planetary gear transmission mechanism has a non-revolving planetary gear, and
    via the injection passage, the oil is jetted to the other of the shafts while bypassing the planetary gear.

9. The lubricating structure for the power transmission system as claimed in claim 1, wherein:
    the one of the shafts is a rotary shaft for an impeller of a supercharger;

a supercharger casing, which forms a case of the supercharger, supports the rotary shaft for the impeller through a bearing;
a lubricating oil film is formed between the supercharger casing and a bearing housing for accommodating the bearing; and
a portion of oil forming the lubricating oil film is supplied to the injection passage.

10. The lubricating structure for the power transmission system as claimed in claim 9, wherein:
the injection passage is formed at the supercharger casing; and
the injection passage is branched off from a lubricant oil passage configure to supply the oil into the lubricating oil film.

11. The lubricating structure for the power transmission system as claimed in claim 9, wherein:
the supercharger is driven by a power of an engine;
a power transmitting member to transmit the power of the engine to the other of the shafts is fitted to the other of the shafts; and
a portion of the oil supplied to the other of the shafts is supplied to the power transmitting member.

12. The lubricating structure for the power transmission system as claimed in claim 1, wherein:
the injection passage has an injection opening disposed on a radially outward side of the one of the shafts and below the one of the shafts; and
the oil is injected obliquely upward from the injection opening.

13. The lubricating structure for the power transmission system as claimed in claim 1, wherein:
the injection passage is formed at a casing, which supports the one of the shafts;
the planetary gear transmission mechanism includes planetary gears rotatably supported by a carrier shaft;
the carrier shaft is fixed to a fixture member fixed to the casing; and
the fixture member is formed with a throughhole that is coaxial with the input and output shafts.

14. The lubricating structure for the power transmission system as claimed in claim 1, wherein the ring gear is meshed with an input gear that is provided on the other of the shafts.

* * * * *